F. MILLER.
TIRE PUNCTURE FINDER.
APPLICATION FILED APR. 1, 1912.

1,037,955.

Patented Sept. 10, 1912.

Witnesses
Olivia B. Kaiser
C. B. Foster

Inventor
Francis Miller
By Nord Nord & Nathan
Attorney

UNITED STATES PATENT OFFICE.

FRANCIS MILLER, OF BELLEVUE, KENTUCKY.

TIRE-PUNCTURE FINDER.

1,037,955.  Specification of Letters Patent.  Patented Sept. 10, 1912.

Application filed April 1, 1912. Serial No. 687,640.

*To all whom it may concern:*

Be it known that I, FRANCIS MILLER, a citizen of the United States, residing at Bellevue, in the county of Campbell and State of Kentucky, have invented certain new and useful Improvements in Tire-Puncture Finders, of which the following is a specification.

My invention relates to an improvement in pneumatic tire puncture finders.

The device herein shown and described constitutes an improvement or a modification of the similar device, forming the subject-matter of my prior application, Serial No. 672,979 filed January 23, 1912.

The object of the present improvement is to enable the detection as well as the exact location of a leak without removing the ring from the tire.

The features of my invention will be more fully set forth in the description of the accompanying drawings, forming a part of this specification, in which:—

Figure 1:
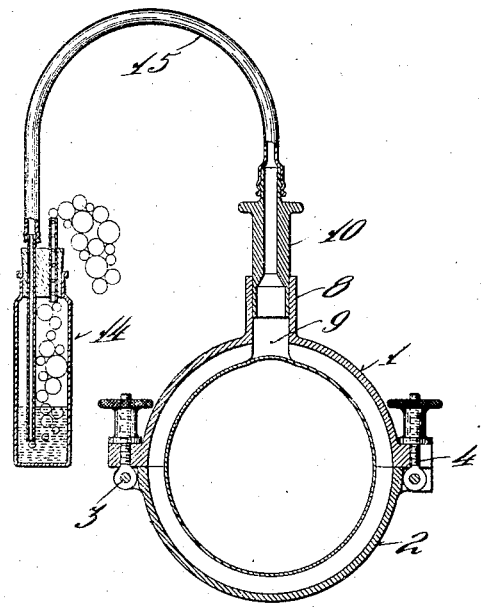
Figure 2:
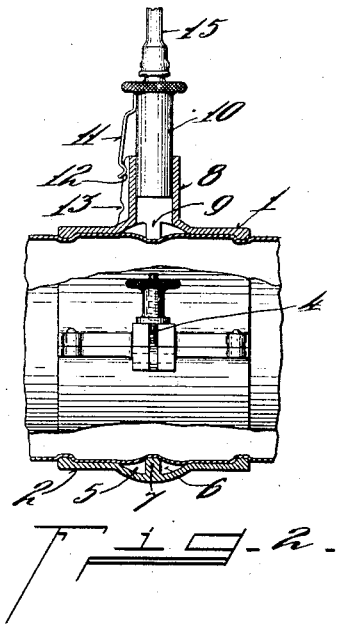
Figure 3:
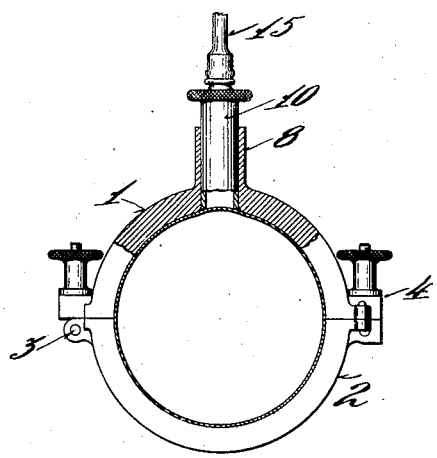
Figure 4:
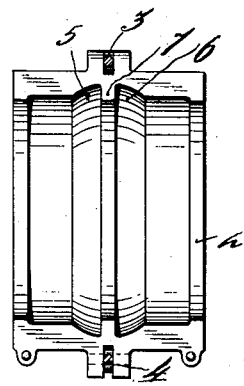

Figure 1 is a central vertical section of the device applied to a tire. Fig. 2 is a longitudinal vertical section partly in elevation. Fig. 3 is an end elevation partly in section. Fig. 4 is a top plan view of the lower ring section.

1, 2, represent ring sections having the hinged connection 3.

4 is the clamping element. The ring sections are adapted to be clamped together and encircle the tube as a unitary structure. The interior formation may best be understood from Figs. 2 and 4. The inner surface of the ring is formed with two circumferential or annular chambers 5, 6, partitioned by the inwardly extending annular rib 7, medially disposed.

Radially projecting from one of the rings is a sleeve 8 alined with rib 7, an orifice 9 being formed through said rib at the inner end of sleeve 8, so that the annular air chambers 5, 6 have a common air-outlet through orifice 9, into sleeve 8.

10 is a tube telescoping in sleeve 8, adapted to be held at the outer or inner end of the sleeve by spring detent 11, and indents 12, 13.

14 is the bubble blower of ordinary type connected by rubber tube 15 with the telescoping tube 10.

In operation, the ring sections encircle the tire, under tension, enabling the ring to be bodily slid over the tire, describing a circle around the wheel center in its movements When the tire surface area is reached where leakage exists, the air will rush into either the chamber 5 or 6, depending on the direction in which the ring is moved. In this step, tube 10 is in its outer position shown in Figs. 1 and 2, and the air escaping through orifice 9 will form bubbles, as indicated in Fig. 1. The next step is to determine definitely the point of leakage relative to the radial line of the wheel, the ring next being moved very slowly until the rib covers the tire puncture, which will prevent the escape of air from the tire, the cessation of bubbles confirming this detection. To definitely locate the leak covered by the rib, preferably tube 10 is moved to its inward position in sleeve 8, the inner end of the tube 10 passing through orifice 9 in rib 7 and contacting the tire. The ring is then rotatively moved, which will bring the inner end of tube 10 directly over the puncture point, again escaping air and forming bubbles. Tube 10 can then be bodily withdrawn, its inner end inked, and reinserted to imprint a circle around the puncture point. The ring can then be removed or if there are additional punctures they can all be located and marked for repair.

Other means could be substituted for the bubble blower, if capable of being influenced by an air current to signify an area or point of leakage.

Having described my invention, I claim:—

1. A leak detector comprising a ring adapted to encircle a pneumatic tube, said ring being interiorly formed with two annular air chambers, a dividing rib, said ring being formed with an air outlet through said rib communicating with both air chambers, an indicator actuated by an air current and a conduit for said indicator having communication with said outlet.

2. A leak detector comprising a ring adapted to encircle a pneumatic tube, said ring being interiorly formed with two annular air chambers and a dividing rib, said ring being formed with an air outlet through said rib communicating with both of said air chambers, an indicator actuated by an air current, and a tube member having a flexible conduit connection with said indicator, the said tube member being adapted to be attached to the ring, so as to communicate with said air outlet orifice.

3. A leak detector comprising a ring adapted to encircle a pneumatic tube, said ring being interiorly formed with two annular air chambers and a dividing rib, said ring being formed with an air outlet through said rib communicating with both of said air chambers, an indicator actuated by an air current, and a tube member having a flexible conduit connection with said indicator, the said tube member being adapted to be attached to the ring, so as to communicate with said air outlet orifice, the inner end of said tube being adapted to be projected through said outlet orifice and brought into contact with the encircled tube.

4. A leak detector comprising a ring adapted to encircle a pneumatic tube, said ring being interiorly formed with two annular air chambers and a dividing rib, a sleeve radially projected outwardly from the ring, said rib being formed with an orifice affording communication between said annular air chambers and said sleeve, an indicator actuated by an air current, and a tube member having a flexible conduit connection with said indicator, said tube member being adapted to telescopically engage the said sleeve, to contact the tube or to be bodily removed from the sleeve.

In testimony whereof, I have hereunto set my hand.

FRANCIS MILLER.

Witnesses:
OLIVER B. KAISER,
EMMA SPENER.